US010743248B2

(12) United States Patent
Davies et al.

(10) Patent No.: US 10,743,248 B2
(45) Date of Patent: Aug. 11, 2020

(54) ESTABLISHING COMMUNICATION WITH MULTIPLE NETWORKS TO ENABLE CONTINUOUS COMMUNICATION COVERAGE ACROSS THE MULTIPLE NETWORKS

(71) Applicant: Juniper Networks, Inc., Sunnyvale, CA (US)

(72) Inventors: Guy Davies, Carquefou (FR); Ian Goetz, Oxfordshire (GB)

(73) Assignee: Juniper Networks, Inc., Sunnyvale, CA (US)

( * ) Notice: Subject to any disclaimer, the term of this patent is extended or adjusted under 35 U.S.C. 154(b) by 90 days.

(21) Appl. No.: 15/886,607

(22) Filed: Feb. 1, 2018

(65) Prior Publication Data

US 2019/0150080 A1 May 16, 2019

(30) Foreign Application Priority Data

Nov. 16, 2017 (EP) .................................. 17306590

(51) Int. Cl.

| | | |
|---|---|---|
| *H04W 48/18* | (2009.01) | |
| *H04W 48/16* | (2009.01) | |
| *H04W 88/16* | (2009.01) | |
| *H04W 92/02* | (2009.01) | |
| *H04L 29/08* | (2006.01) | |

(Continued)

(52) U.S. Cl.
CPC ........ *H04W 48/18* (2013.01); *H04B 7/18513* (2013.01); *H04L 29/08* (2013.01); *H04W 40/00* (2013.01); *H04W 48/16* (2013.01); *H04W 48/20* (2013.01); *H04W 88/16* (2013.01); *H04W 92/02* (2013.01); *H04B 7/185* (2013.01); *H04W 72/08* (2013.01); *H04W 88/06* (2013.01)

(58) Field of Classification Search
USPC ........................................................ 370/329
See application file for complete search history.

(56) References Cited

U.S. PATENT DOCUMENTS

| | | |
|---|---|---|
| 2014/0071895 A1 | 3/2014 | Bane et al. |
| 2014/0136658 A1 | 5/2014 | Wahler |

(Continued)

OTHER PUBLICATIONS

Extended European Search Report corresponding to EP 17 30 6590, dated May 5, 2018, 9 pages.

(Continued)

*Primary Examiner* — Gregory B Sefcheck
*Assistant Examiner* — Majid Esmaeilian
(74) *Attorney, Agent, or Firm* — Harrity & Harrity, LLP

(57) ABSTRACT

An example user device may include a terrestrial mobile network radio; a satellite network radio; and one or more processors to establish, via the terrestrial mobile network radio, a first communication link with a terrestrial mobile network, establish, via the satellite network radio, a second communication link with a satellite network, monitor a characteristic of the first communication link and a characteristic of the second communication link, select the terrestrial mobile network or the satellite network for traffic communication based on the characteristic of the first communication link and the characteristic of the second communication link, and/or perform an action associated with the traffic communication based on selecting the terrestrial mobile network or the satellite network for traffic communication.

20 Claims, 5 Drawing Sheets

(51) Int. Cl.
*H04W 40/00* (2009.01)
*H04W 48/20* (2009.01)
*H04B 7/185* (2006.01)
*H04W 72/08* (2009.01)
*H04W 88/06* (2009.01)

(56) References Cited

U.S. PATENT DOCUMENTS

| | | | |
|---|---|---|---|
| 2016/0286410 A1* | 9/2016 | O'Malley | G06Q 30/06 |
| 2016/0337954 A1* | 11/2016 | Gulati | H04W 76/14 |
| 2017/0046216 A1* | 2/2017 | Stenneth | G06F 11/0793 |
| 2017/0086052 A1* | 3/2017 | Hunukumbure | H04W 4/90 |
| 2017/0303286 A1* | 10/2017 | Sang | H04W 72/042 |
| 2018/0013500 A1* | 1/2018 | Liao | H04J 11/0023 |
| 2018/0092093 A1* | 3/2018 | Ramaswamy | H04W 16/14 |
| 2018/0287817 A1* | 10/2018 | Gault | H04L 12/4633 |
| 2018/0343593 A1* | 11/2018 | Singh | H04W 48/18 |
| 2019/0102692 A1* | 4/2019 | Kwant | G06K 9/6247 |

OTHER PUBLICATIONS

Livewire Digital LTD, "Livewire Digital Ltd launches RazorLink®—the solution for faster, more reliable, more secure network connections", https://www.livewire.co.uk/livewire-digital-launches-razorlink/, Jul. 25, 2016, 4 pages.

Livewire Digital LTD, "Livewire Digital secures an ESA €900k contract from the ARTES programme to develop RazorLink® Smart Networking", https://www.livewire.co.uk/esa-contract/, May 29, 2017, 5 pages.

Livewire Digital LTD, "WAN Optimisation", https://www.livewire.co.uk/solutions/wan-optimisation/, Copyright 2005-2018, 6 pages.

* cited by examiner

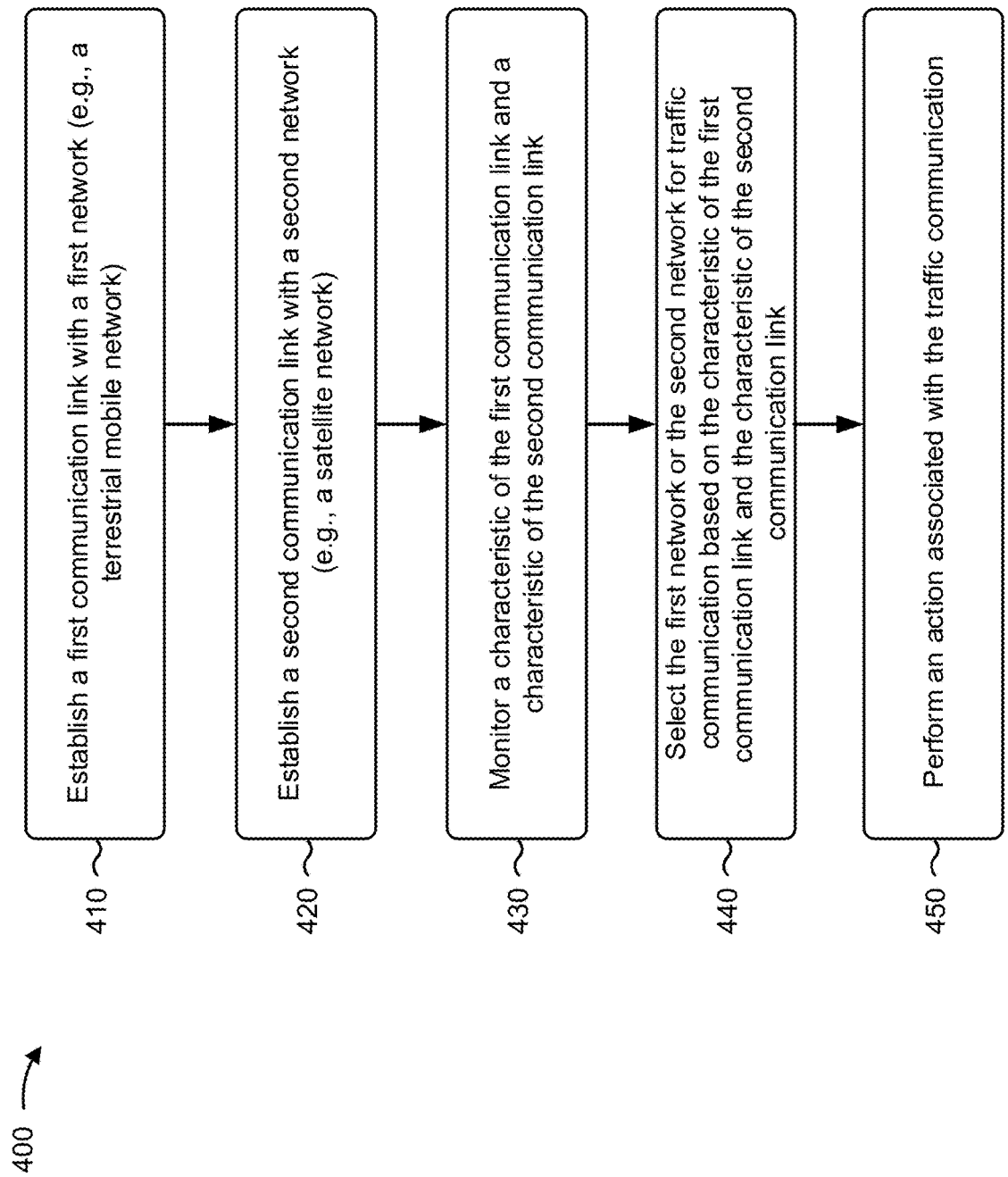

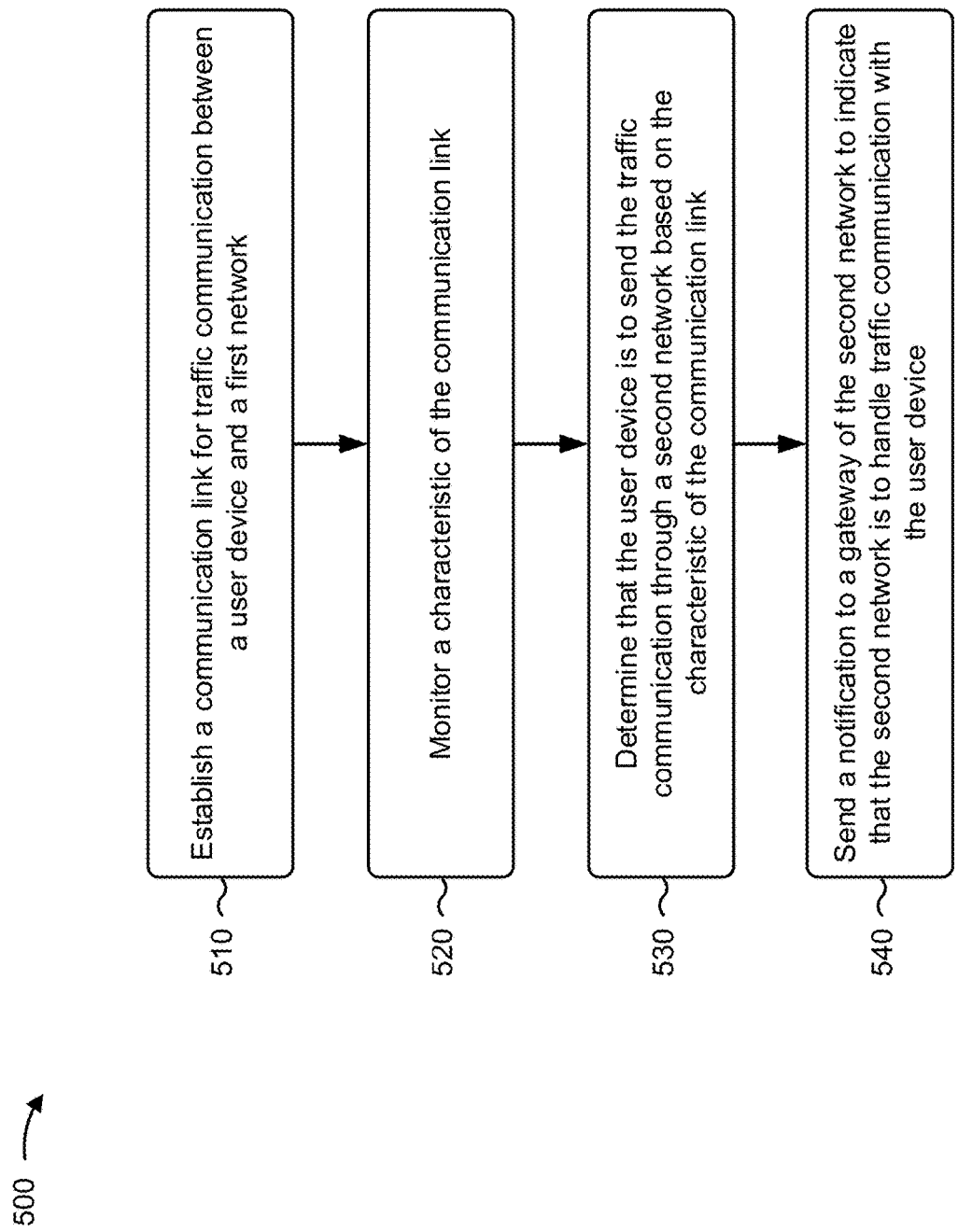

ESTABLISHING COMMUNICATION WITH MULTIPLE NETWORKS TO ENABLE CONTINUOUS COMMUNICATION COVERAGE ACROSS THE MULTIPLE NETWORKS

BACKGROUND

This application claims priority under 35 U.S.C. § 119 to European Patent Application No. EP 17306590.5, filed on Nov. 16, 2017, the content of which is incorporated by reference herein in its entirety.

BACKGROUND

A mobile network (or cellular network) is a communication network that facilitates wireless communication between mobile devices. The mobile network is distributed over land areas, which may be referred to as cells, that are served by one or more base stations at fixed-locations of the land areas. The one or more base stations provide network coverage within the cells. In some instances, a mobile network may be regulated and/or controlled by one or more entities (e.g., governmental entities, service provider entities, and/or the like).

SUMMARY

According to some implementations, a user device may include a terrestrial mobile network radio; a satellite network radio; and one or more processors to establish, via the terrestrial mobile network radio, a first communication link with a terrestrial mobile network, establish, via the satellite network radio, a second communication link with a satellite network, monitor a characteristic of the first communication link and a characteristic of the second communication link, select the terrestrial mobile network or the satellite network for traffic communication based on the characteristic of the first communication link and the characteristic of the second communication link, and/or perform an action associated with the traffic communication based on selecting the terrestrial mobile network or the satellite network for traffic communication.

According to some implementations, a method may include causing, by a device, a first communication link to be established between a user device and a first terrestrial mobile network regulated by a first governmental entity; causing, by the device, a second communication link to be established between the user device and a second terrestrial mobile network regulated by a second governmental entity wherein the second governmental entity is different from the first governmental entity; monitoring, by the device, a characteristic of the first communication link and a characteristic of the second communication link; selecting, by the device, the first terrestrial mobile network or the second terrestrial mobile network for traffic communication based on the characteristic of the first communication link and the characteristic of the second communication link; and/or performing, by the device, an action associated with the traffic communication based on selecting the first terrestrial mobile network or the second terrestrial mobile network for traffic communication.

According to some implementations, a non-transitory computer-readable medium storing instructions may include one or more instructions that, when executed by one or more processors, cause the one or more processors to cause a first communication link to be established between a user device and a first terrestrial mobile network operated by a first service provider entity; cause a second communication link to be established between the user device and a second terrestrial mobile network operated by a second service provider entity, wherein the second service provider entity is different from the first service provider entity; monitor a characteristic of the first communication link and a characteristic of the second communication link; select the first terrestrial mobile network or the second terrestrial mobile network for traffic communication based on the characteristic of the first communication link and the characteristic of the second communication link; and/or perform an action associated with the traffic communication based on selecting the first terrestrial mobile network or the second terrestrial mobile network for traffic communication.

BRIEF DESCRIPTION OF THE DRAWINGS

FIG. 4 is a flow chart of an example process for establishing communication with multiple networks to enable continuous communication coverage across the multiple networks; and FIG. 5 is a flow chart of an example process associated with establishing communication with multiple networks to enable continuous communication coverage across the multiple networks.

DETAILED DESCRIPTION

Figure 1:
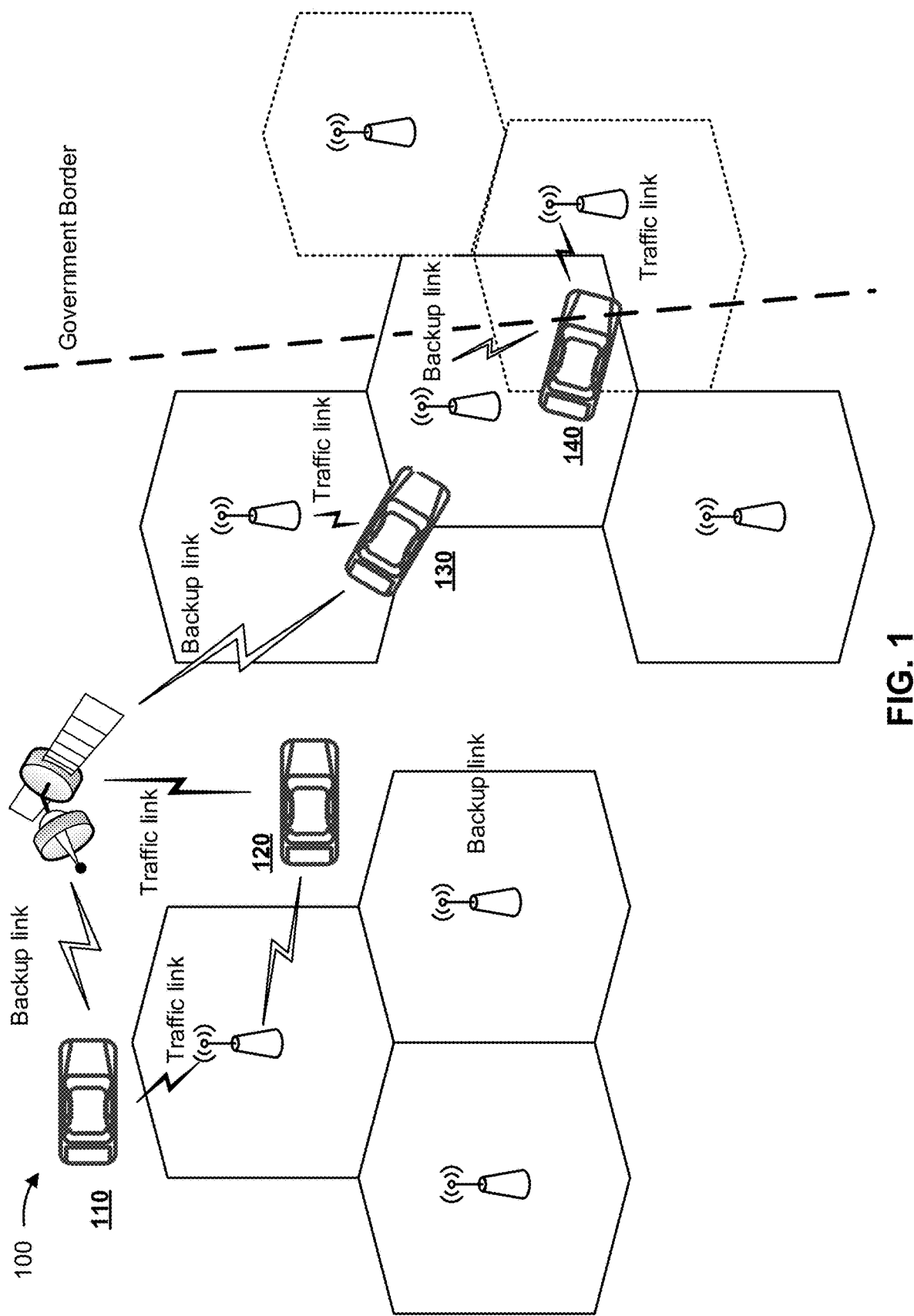
FIG. 1 is a diagram of an overview of an example implementation described herein.

The following detailed description of example implementations refers to the accompanying drawings. The same reference numbers in different drawings may identify the same or similar elements.

In some instances, a subscriber, to a mobile network (e.g., a cellular network), may carry a user device associated with the mobile network and travel across multiple land areas in which the mobile network may or may not have coverage. In such cases where the mobile network does not have coverage, the user device may attempt to connect to another mobile network (e.g., a roaming network) after connection with the mobile network is lost or dropped. Additionally, or alternatively, the subscriber may cross a border between regions that are controlled by different governmental entities (e.g., borders between countries). In such cases, the mobile network of the subscriber in a first governmental region may not be registered with a mobile network in the second governmental region. Accordingly, the user device performs a process to connect to the local mobile network of the corresponding governmental region. Such processes (e.g., connecting to a roaming network, transferring between mobile networks of different governmental regions, and/or the like) can take extended periods of time (e.g., over 5 seconds, over 10 seconds, etc.). In many instances, the extended periods of time can be problematic when the user device is accessing information that is to be updated on the order of milliseconds for one or more applications (e.g., autonomous driving, proximity analysis of moving vehicles, streaming media, voice calls, and/or the like), resulting in loss of communication and/or data loss. Some implementations described herein may provide relatively ubiquitous coverage for user devices when transitioning between networks (e.g., between mobile networks, between a mobile network and a satellite network, and/or the like).

According to some implementations, a subscriber may subscribe to multiple networks that are serviced and/or regulated by different entities (e.g., different service provider entities, different governmental entities, and/or the like). As such, a user device of the subscriber may be registered with the multiple networks capable of providing a service (e.g., via hosting an application). In some implementations, the multiple networks may include a terrestrial mobile network (i.e., a land-based mobile network) and a satellite network, two or more terrestrial mobile networks, two or more terrestrial mobile networks and one or more satellite networks, and so on. According to some implementations described herein, a user device may establish a communication link with a first network and a second network to ensure ubiquitous and continuous coverage for traffic communication associated with the provided service. In such cases, the user device may monitor characteristics of the communication links and, based on the characteristics of the communication links, select one of the networks (e.g., one of a terrestrial mobile network or a satellite network) for traffic communication. Accordingly, because an alternative communication link has already been established, a transition to send communication traffic from one terrestrial mobile network to another terrestrial mobile network, or from one terrestrial mobile network to a satellite network (and vice versa) causes little to zero loss in relative communications associated with the provided service. As such, a user device may maintain coverage across multiple regions (e.g., even if outside of a coverage range of a terrestrial mobile network), preventing loss of data, communication failures, and/or failures associated with the user device.

FIG. 1 is a diagram of an overview of an example implementation 100 described herein. In FIG. 1, a user device (shown as a vehicle) traverses an area of land that includes a first terrestrial mobile network (shown with solid-lined cells), a second terrestrial mobile network (shown with dashed-lined cells), and a government border. Additionally, in the example implementation 100 of FIG. 1, a satellite of a satellite network may be used for communication with the user device. As described herein, the user device uses multiple, concurrent (or simultaneous) communication links to ensure continuous access, as the user device is mobile, to a service (e.g., autonomous driving, proximity analysis (e.g., determining distances between vehicles), data streaming, data analysis, and/or the like), which may be provided by an application hosted (e.g., within a mobile edge computing (MEC) server) by the first terrestrial mobile network, the second terrestrial mobile network, and/or the satellite network.

As shown in FIG. 1, and by reference number 110, the user device has established a communication link with a base station of the first terrestrial mobile network and a separate, concurrent communication link with the satellite of the satellite network. As shown, the user device has set the communication link between the user device and the base station of the first terrestrial mobile network as the primary link for the service, while the satellite link is set as a backup link for the service. As shown by reference number 120, the user device is no longer within coverage of the first terrestrial mobile network, and thus switches the primary link from the communication link with the base station of the first terrestrial mobile network to the communication link with the satellite of the satellite network, thus ensuring continuous access to the service despite being outside of coverage of the first terrestrial mobile network.

As further shown in FIG. 1, and by reference number 130, as the user device reenters a coverage area of the first terrestrial mobile network, the user devices reestablishes a communication link with a base station of the first terrestrial mobile network and sets that communication link with the base station as the primary link for the service and the satellite as the backup link for the service. For example, the user device may have a default setting to use the first terrestrial mobile network over the satellite network as long as a strong enough connection with the first terrestrial mobile network is established.

As further shown in FIG. 1, and by reference number 140, as the user device comes within range of a second terrestrial mobile network, which may be regulated by a separate governmental entity (as the base stations are located across the government border of the first terrestrial mobile network), the user device may establish a connection with the second terrestrial mobile network and set the communication link with the second terrestrial mobile network as the primary link and the communication link with the first terrestrial mobile network as the backup link. In some implementations, prior to setting the communication link with the second terrestrial network as the traffic link, the user device may establish the communication link with the second terrestrial mobile network as a backup link (e.g., to allow for relatively seamless transition to set the communication link with the second terrestrial mobile network as the primary link). As such, in some instances the user device may have established separate and concurrent communication links with all three of the first terrestrial mobile network, the second terrestrial mobile network, and the satellite network. According to some implementations, the user device may determine that the user device is crossing a government border (e.g., based on a location, a direction of travel, and/or the like) into a different governmental region, and thus may set the communication link for the service with the second terrestrial network as the primary link prior to crossing the government border.

As such, the user device of example implementation 100 may have continuous access to a service offered by the first terrestrial mobile network, the second terrestrial mobile network, and the satellite network. Accordingly, the user device may avoid loss of communication, data loss, and/or the like associated with losing access to the service. In some implementations, this may result in preventing damage to the user device (e.g., damage to a vehicle due to latent hazard communications), preventing communication failures of the user device, and/or the like. Furthermore, some implementations described herein may conserve network resources by not attempting communications with a network that is likely to fail (e.g., because a user device may be out of range of the network). Accordingly, satellite network resources, which tend to be relatively expensive, in some implementations, may only be accessed when needed by a user device in order to conserve the network resources of the satellite network.

As indicated above, FIG. 1 is provided merely as an example. Other examples are possible and may differ from what was described with regard to FIG. 1.

Figure 2:
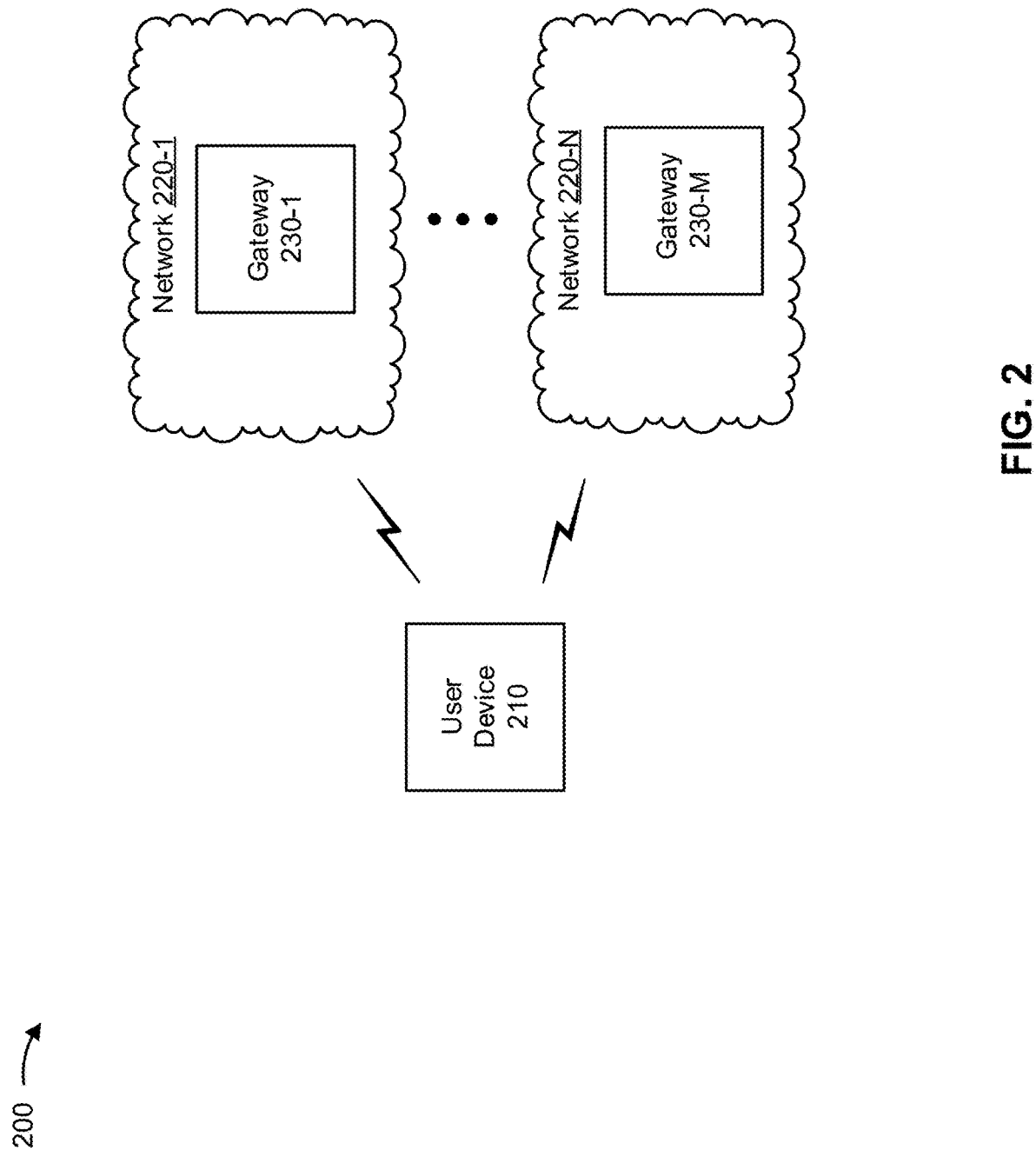
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210 and networks 220-1 through 220-N (N≥1) (hereinafter referred to collectively as networks 220," and individually as "network 220") including corresponding gateways 230-1 through 210-M (M≥1) (hereinafter referred to collectively as gateways 230," and individually as "gateway 230"). Devices of environment 200 may interconnect via wired connections, wireless connections, or a combination of wired and wireless connections.

User device 210 includes one or more devices capable of receiving, generating, storing, processing, and/or providing information associated with establishing communication links with multiple networks, monitoring characteristics of the communication links, and selecting one of the communication links for traffic communication based on the characteristics of the communication links. For example, user device 210 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a control console of a vehicle, a navigational computer of an autonomous vehicle or semi-autonomous, or a similar type of device.

In some implementations, user device 210 may have or include applications associated with software defined wide area network (SD-WAN) capabilities. Accordingly, in such cases, user device 210 may utilize SD-WAN to ensure ubiquitous and continuous communication with a service or application of networks 220 (e.g., to monitor characteristics of communication links with networks 220, select one or more of the networks 220 for traffic communication, perform an action associated with the traffic communication, and/or the like).

Network 220 includes one or more wired and/or wireless networks. For example, network 220 may include a terrestrial mobile network (e.g., a cellular network, such as a long-term evolution (LTE) network, a code division multiple access (CDMA) network, a 3G network, a 4G network, a 5G network, another type of next generation network, etc.), a public land mobile network (PLMN), a satellite network, a narrow band Internet of Things (Nb-IOT) network, or the like, and/or a combination of these or other types of networks. According to some implementations, each of networks 220 are regulated by different governmental entities (e.g., governments of separate countries that invoke various or different communication laws relative to one another) and/or operated by different service provider entities (e.g., service providers that involve different subscriptions (and associated agreements/contracts), different performance levels, different performance capabilities, different costs, and/or the like).

In some implementations, respective distances between networks 220 may vary. For example, a base station of one of the networks 220 may be within 80 kilometers or 120 kilometers, while a satellite of another one of the networks 220 may be 3200 to 40,000 kilometers away. In such cases, the base station of one of the networks 220 may be closer to user device 210, providing relatively low latency (and/or associated costs) but a relatively short range of coverage, while the satellite of one of the networks 220 may provide greater coverage (e.g., over an entire hemisphere of the earth), but increased latency (and/or associated costs).

According to some implementations, network 220 may include one or more access points (e.g., base stations, satellites, and/or the like) and/or one or more multi-access edge computing (MEC) servers. In such instances, the access points and/or MEC servers may be monitored and/or controlled by one or more gateways 230. According to some implementations, the access points and/or MEC servers may host applications associated with providing a service to user device 210. As such, user device 210 may have continuous access to the service via instances of the applications hosted by networks 220. For example, user device 210 may utilize multiple radios to communicate with respective instances of applications hosted by the access points and/or MEC servers.

Gateway 230 includes one or more devices capable of storing, processing, and/or routing information associated with enabling user device 210 to transition between networks 220 according to some implementations described herein. In some implementations, gateway 230 may include a communication interface that allows gateway 230 to receive information from and/or transmit information to other devices in environment 200 (e.g., user device 210, other gateways 230, and/or other devices in communication with networks 220). In some implementations, gateway 230 may control one or more instances of an application (e.g., MEC applications running on access points of networks 220) that is associated with user device 210. Accordingly, in some implementations, gateway 230 may include a MEC gateway.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
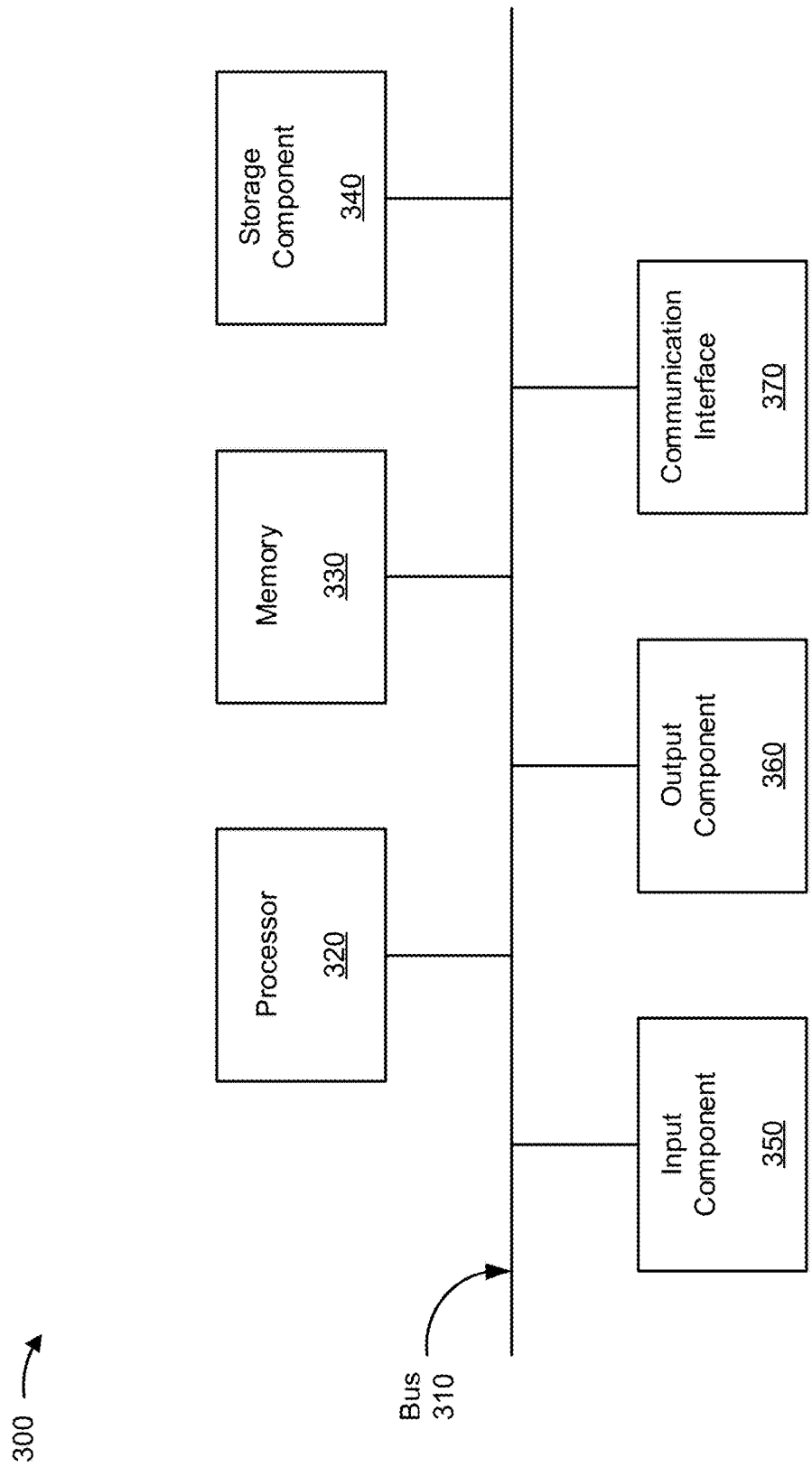
FIG. 3 is a diagram of example components of one or more devices of FIG. 2.

FIG. 3 is a diagram of example components of a device 300. Device 300 may correspond to user device 210 and/or gateway 230. In some implementations, user device 210 and/or gateway 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for establishing communication with multiple networks to enable continuous communication coverage across the multiple networks. In some implementations, one or more process blocks of FIG. 4 may be performed by user device 210. In some implementations, one or more process blocks of FIG. 4 may be performed by another device or a group of devices separate from or including user device 210, such as gateway 230.

Although the following description refers to an example implementation involving user device 210 communicating (e.g., via established communication links) with a terrestrial mobile network and a satellite mobile network, in some implementations, user device 210 may communicate via two terrestrial mobile networks operated by different service providers or two terrestrial mobile networks regulated by different governmental entities. Furthermore, in some implementations, user device 210 may communicate via more than two networks 220 (e.g., two or more terrestrial mobile networks and/or one or more satellite mobile networks). As described in the following descriptions, a terrestrial mobile network and/or a satellite network are considered to be one of networks 220 of FIG. 2.

As shown in FIG. 4, process 400 may include establishing a first communication link with a first network (block 410). For example, user device 210 may establish a communication link with a terrestrial mobile network. In some implementations, user device 210 may establish the communication link based on being powered on, based on entering a coverage area of the terrestrial mobile network, based on receiving a beacon from the terrestrial mobile network, and/or the like.

According to some implementations, a communication link may include any communication session between user device 210 and network 220 that is used for access to a service or application offered or hosted by network 220. As used herein, traffic communication may include transmissions and/or receipt of traffic, such as packet data (e.g., message data, application data, streaming data, and/or the like), that is associated with the service or application offered by network 220. In some implementations, establishing a communication link may involve network 220 establishing an instance of an application on a device (e.g., access point) of network 220.

In some implementations, the first communication link may be established using a suitable communication protocol corresponding to the first network 220. For example, for a terrestrial mobile network, user device 210, using a terrestrial mobile network radio, may exchange a series of beacons and/or messages with a base station of the terrestrial mobile network to establish the first communication link. In such instances, once the first communication link is established with the terrestrial mobile network, user device 210 and/or the terrestrial mobile network may maintain the established first communication link via a series of hand-offs between base stations, of the terrestrial mobile network, that are in range of a terrestrial mobile network radio of user device 210.

According to some implementations, a terrestrial mobile network may be operated by a particular service provider entity. For example, the service provider entity may manage communication links of the terrestrial mobile network, maintain operations of base stations and other equipment of the terrestrial mobile network, and/or be associated (e.g., contractually) with a subscriber of user device 210 that is registered to the terrestrial mobile network. As such, different networks 220 may be operated by different service provider entities.

In some implementations, a terrestrial mobile network may be regulated by a particular governmental entity (e.g., a government of a sovereign nation). For example, the governmental entity may institute and/or enforce communication laws regarding use and communications between user device 210 and the terrestrial mobile network. As such, different networks 220 may be regulated by different governmental entities.

In this way, user device 210 may establish a communication link with a first network, such as a terrestrial mobile network.

As further shown in FIG. 4, process 400 may include establishing a second communication link with a second network (block 420). For example, user device 210 may establish a second communication link with a satellite network (e.g., or with another terrestrial mobile network operated by a different service provider entity and/or regulated by a different governmental entity). In some implementations, user device 210 may establish the second communication link based on entering a coverage area of the satellite network (or having a clear path to a satellite of the satellite network), based on receiving a beacon from the satellite network, and/or the like.

The second communication link may be established using a suitable communication protocol corresponding to the second network 220. For example, for a satellite network, user device 210, using a satellite network radio, may exchange a series of beacons and/or messages with a satellite of the satellite network to establish the second communication link. In such instances, once the second communication link is established with the satellite network, user device 210 and/or the satellite network may maintain the established second communication link via a series of handoffs between satellites of the satellite network that are in range of the satellite radio of user device 210.

Accordingly, user device 210 may utilize two or more radios (e.g., one or more terrestrial mobile network radios and one or more satellite network radios) to establish the first communication link and the second communication link. According to some implementations, establishing the second communication link may involve the second network establishing a second instance of the application that was established in the first network. Accordingly, user device 210 may simultaneously have access to the application via multiple communication links. Therefore, the second communication link may be maintained simultaneously with the first communication link.

According to some implementations, the second communication link may be established with another terrestrial mobile network. For example, the other terrestrial mobile network may be operated by a different service provider entity or regulated by a different governmental entity than the terrestrial mobile network of the first communication link. In such cases where user device 210 establishes a first communication link and a second communication link with terrestrial mobile networks operated by different service provider entities, user device 210 may be registered with both service provider entities (e.g., include separate subscriber identity module (SIM) cards to communicate via the two terrestrial mobile networks) and within coverage areas of both terrestrial mobile networks. Accordingly, user device 210 may be capable of exchanging traffic communications via one or both of the terrestrial mobile networks that are operated by different service provider entities. In such cases where user device 210 establishes a first communication link and a second communication link with terrestrial mobile networks regulated by separate governmental entities, user device 210 may be along a border between countries and in a coverage area of a terrestrial mobile network of a first country and a terrestrial mobile network of a second country. Accordingly, user device 210 may be capable of exchanging traffic communications via one or both of the terrestrial mobile networks that are operated by different governmental entities.

In this way, user device 210 may establish a communication link with a second network, such as a satellite network.

As further shown in FIG. 4, process 400 may include monitoring a characteristic of the first communication link and a characteristic of the second communication link (block 430). For example, user device 210 may monitor the respective characteristic of the communication links. For example, user device 210 may monitor a characteristic of the first communication link between user device 210 and the terrestrial mobile network and a characteristic of the second communication link between user device 210 and the satellite network. In some implementations, user device 210 may monitor the characteristic of the first communication link and characteristic of the second communication link based on user device 210 establishing the first communication link and the second communication link.

In some implementations, user device 210 simultaneously monitors the respective characteristic of the first communication link and the characteristics of the second communication link. Additionally, or alternatively, the characteristic of the first communication link may correspond to the characteristic of the second communication link (e.g., the characteristic of the first communication link and the characteristic of the second communication link are the same type of characteristic).

According to some implementations, the characteristic of the first communication link and/or the characteristic of the second communication link monitored by user device 210 may include a latency of the first communication link and the second communication link, a throughput (e.g., available bandwidth) of the first communication link and the second communication link, an error rate of the first communication link and the second communication link, a cost (e.g., a monetary cost) associated with communicating via the first communication link and communicating via the second communication link, a strength of signal on the first communication link and the second communication link, a quality of service associated with communicating via the first communication link and communicating via the second communication link, and/or the like.

In some implementations, latency of a communication link with one of networks 220 may be affected by a distance between user device 210 and an access point (e.g., a base station, a satellite, and/or the like) of the one of networks 220. According to some implementations, throughput of a communication link may be affected by a service level agreement, communication capabilities of a radio of the user device 210 used for the communication link, communication capabilities of an access point of one of networks 220 used for the communication link, and/or the like. In some implementations, an error rate of a communication link may be affected by a distance between user device 210 and an access point of one of networks 220, multipath, signal power, and/or the like. In some implementations, cost may be affected by an agreed upon value for communication (e.g., traffic communication) between the user device 210 and one of networks 220. For example, the cost may include a subscription fee and/or a usage fee (corresponding to an amount of traffic data communicated via one of the networks 220). In some implementations, a strength of signal on the first communication link and the second communication link may be affected by interfering structures and/or a distance between user device 210 and an access point of one of the networks. In some implementations, a quality of service associated with communicating via the first communication link and communicating via the second communication link may be affected by interfering signals between user device 210 and an access point of networks 220.

According to some implementations, user device 210 may monitor the characteristics of the first communication link and characteristics of the second communication link by measuring latency, throughput, error rate, signal power, signal strength, and/or the like at a radio used for the communication link. User device 210 may use any suitable techniques to measure the latency, throughput, error rate, signal power, signal strength, and/or the like. For example, user device 210 may utilize communication link performance using SD-WAN. In some implementations, user device 210 may access cost information indicating a cost of traffic communications via the communication link. For example, the cost information may indicate how much a subscriber may need to pay to send or receive traffic over the communication link (e.g., based on a particular data usage rate, based on whether the subscriber has reached an allocated usage, and/or the like).

In some implementations, user device 210 may monitor a plurality of characteristics of the first communication link and/or a plurality of characteristics of the second communication link. In this case, user device 210 may combine values associated with the plurality of characteristics to generate a score for the first communication link or the second communication link. In some implementations, user device 210 may use a weighted combination of the values to generate the score. The score may represent a measure of quality of the first communication link or the second communication link and may be used to select one of the first communication link or the second communication link.

In this way, user device 210 may monitor one or more characteristics of the first communication link and one or more characteristics of the second communication link to enable user device 210 to select a network for traffic communication.

As further shown in FIG. 4, process 400 may include selecting the first network or the second network for traffic communication based on the characteristic of the first communication link and the characteristic of the second communication link (block 440). For example, user device 210 may select a terrestrial mobile network or a satellite network based on a characteristic of a communication link with the terrestrial mobile network and a characteristic of a communication link with the satellite network. In some implementations, user device 210 may select the terrestrial mobile network or the satellite network for traffic communication based on a change in one of the characteristics of the first communication link or the second communication link.

As described above, traffic communication may involve communication associated with applications, for providing a service, that may be running on user device 210 and/or instances of applications controlled by gateways 230 that are running on devices of networks 220. As such, a terrestrial mobile network and/or a satellite network may be used to exchange traffic communications corresponding to the applications. Accordingly, user device 210 may select which of the terrestrial mobile network or the satellite network is best for traffic communication based on the characteristic of the communication link with the terrestrial mobile network and the characteristic of the communication link with the satellite network. In other words, if one of the terrestrial mobile network or satellite network has a characteristic indicating a poor connection (e.g., a connection that may affect traffic communication), then user device 210 may select the other network. Accordingly, in some implementations, ubiquitous communication with an application for a service, such as autonomous driving control, may be critical to ensure safety (e.g., that a vehicle remains on a road, avoids obstacles, follows a particular route, and/or the like).

In some implementations, user device 210 may utilize default settings to select one of the networks 220 for traffic communication to access a service or application. For example, if a characteristic of a communication link with a terrestrial mobile network and a characteristic of a communication link with a satellite network both indicate a strong connection between the terrestrial mobile network and the satellite network, user device 210 may default to using the terrestrial mobile network (e.g., which may offer lower latency, be more cost effective, and/or the like). In some implementations, user device 210 may use communication link performance monitoring and/or failover capabilities of SD-WAN to select one of the networks 220 for traffic communication to access the service or application. For example, when user device 210, via SD-WAN monitoring of one of the radios of user device 210 in communication with one of the networks 210, determines an error rate, packet loss rate, and/or other similar characteristic that indicates a loss in performance and/or a need for a failover, user device 210 may select another one of the networks 220 for the communication.

In some implementations, user device 210 can utilize a scoring system to select a terrestrial mobile network or a satellite network based on the characteristic of the first communication link and/or the characteristic of the second communication link. For example, user device 210 can apply scores and/or weights (w) to parameters corresponding to characteristics of the communication links (e.g., latency, throughput, error rate, cost, and/or the like). As such, user device 210 may calculate scores ($s_i$) for networks 220 i that are communicatively linked (e.g., via established communication links) with user device 210. For example, user device 210 can calculate the following score ($s_i$) for a network 220 i:

$$s_i = w_{ai}a_i + w_{bi}b_i + w_{ci}c_i \qquad (1)$$

where $w_{ai}$, $w_{bi}$, $w_{ci}$ can correspond to weights corresponding to characteristics $a_i$, $b_i$, $c_i$. Accordingly, in some implementations, the weights $w_{ai}$, $w_{bi}$, $w_{ci}$ may vary for different networks 220. For example, a first weight for a first characteristic of a first network may be different than a second weight for the first characteristic of a second network. In some implementations, the weights $w_{ai}$, $w_{bi}$, $w_{ci}$ may be determined or adjusted based on a setting of the user device 210, preferences of a subscriber (e.g., which may be received via user input from a user interface of user device 210), and/or the like. In some implementations, user device 210 may use machine learning to select an appropriate network 220 for traffic communication. For example, the machine learning may involve monitoring successful and/or unsuccessful transitions between networks 220 when characteristics of the communication links had certain parameters and/or when user device 210 was at a particular location or traveling in a particular direction.

According to some implementations, user device 210 selects the terrestrial mobile network or the satellite mobile network for traffic communication in order to ensure the ability to continuously communicate traffic. For example, user device 210 may be running an application that is to maintain a minimal latency in communication between user device 210 and gateways 230 running on the terrestrial mobile network and the satellite network. As a more specific example, the application may correspond to autonomous control of a vehicle, proximity analysis of a vehicle, and/or the like. In such instances, gateway 230, may control an instance of the application, running on the corresponding network 220, that is used or accessed by user device 210, may enable user device 210 to transition to another network 220 selected by user device 210 without interrupting operation of the application by allowing user device 210 to utilize another instance of the application running on the other network 220. Avoiding such interruptions may be critical to avoiding serious failures that may result in physical harm to property and/or individuals (e.g., as a result of an autonomous vehicle collision.

According to some implementations, user device 210 may select a terrestrial mobile network and/or a satellite network based on a determined location of user device 210. For example, user device 210 may determine (e.g., via a global positioning system (GPS), a triangulation calculation, and/or the like) that user device 210 is approaching a particular area where a terrestrial mobile network has little to zero coverage. Accordingly, in such a case (e.g., additionally, or alternatively, to using characteristics of the communication links), user device 210 may select a satellite network for traffic communication to ensure continuous traffic communication. In some instances, user device 210 may determine that user device 210 has entered into a region associated with a different terrestrial mobile network (e.g., a terrestrial mobile network that is regulated by a different governmental entity). In such cases, user device 210 may select the local terrestrial mobile network for traffic communication (e.g., assuming that the user device 210 is to remain in the new region for an extended period of time (e.g., more than 10 minutes) based on direction of travel, navigation information associated with user device 210, a calendar event location associated with user device 210, and/or the like).

In this way, user device 210 may select one of networks 220 for traffic communication based on a characteristic of the one of the networks 220 to enable user device 210 to maintain continuous traffic communication.

As further shown in FIG. 4, process 400 may include performing an action associated with the traffic communication (block 450). For example, user device 210 may perform the action associated with exchanging the traffic communication via a terrestrial mobile network or a satellite network. In some implementation, user device 210 performs the action based on selecting the first network (e.g., the terrestrial mobile network) or the second network (e.g., the satellite network).

According to some implementations, performing the action may include transmitting traffic via a radio of user device 210 associated with selected network 220. For example, if user device 210 selects a terrestrial mobile network for traffic communication, user device 210 may use a terrestrial mobile network radio to communicate traffic. In such cases where user device 210 selects a satellite network, user device 210 may communicate traffic via a satellite network radio. In some implementations, when user device 210 begins sending traffic via a radio corresponding to one of the networks 220, corresponding gateways 230 (e.g., a gateway 230 previously used for traffic communication and a gateway 230 currently used for traffic communication) may coordinate with one another to ensure continuous traffic communication with user device 210. For example, gateways 230 may ensure that instances of an application respectively run on the different networks 220 are synchronized. In some implementations, as further described below, gateways 230 may communicate with one another when it is determined that user device 210 is to switch between networks 220. Additionally, or alternatively, user device 210 may communicate with gateways 230 (e.g., by serving as a relay) to indicate which network has been selected for traffic communication.

In some implementations, user device 210 may send a notification to gateway 230 of selected network 220 to indicate that traffic communication is to be exchanged through selected network 220. Additionally, or alternatively, user device 210 may send a notification to a gateway 230 of a network 220 previously used for traffic communication to indicate that traffic communication is to be exchanged through the selected network 220 (not the network 220 previously used for traffic communication).

In this way, user device 210 may perform an action associated with the traffic communication to ensure that continuous traffic communication is maintained.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 associated with establishing communication with multiple networks to enable continuous communication coverage across the multiple networks. In some implementations, one or more process blocks of FIG. 5 may be performed by gateway 230. In some implementations, one or more process blocks of FIG. 5 may be performed by another device or a group of devices separate from or including gateway 230, such as user device 210.

As shown in FIG. 5, process 500 may include establishing a communication link for traffic communication between a user device and a first network (block 510). For example, gateway 230 may facilitate establishing the communication link with user device 210 via corresponding network 220. In some implementations, gateway 230 may establish the communication link for traffic communication based on user device 210 entering a coverage area of a corresponding network 220 of gateway 230, based on instructions from another gateway 230, based on a request from user device 210, and/or the like.

Gateway 230 may establish the communication link for traffic communication using any suitable technique (e.g., in a similar manner as described above with respect to process blocks 410 and 420 to establish a communication link). In some implementations, gateway 230 may control instances of an application, running on a corresponding network 220, associated with the traffic communication with user device 210. In such instances, gateway 230 may exchange traffic communication with user device 210 that is associated with the application.

In this way, gateway 230 may establish a communication link with user device 210 to enable gateway 230 to exchange communication traffic and/or monitor a characteristic of the communication link.

As further shown in FIG. 5, process 500 may include monitoring a characteristic of the communication link (block 520). For example, gateway 230 may monitor the characteristic (e.g., by measuring signal or data characteristics associated with the communication traffic) of the communication link with user device 210. In some implementations, gateway 230 may monitor the characteristic of the communication link based on the communication link being established for traffic communication with user device 210.

According to some implementations, gateway 230 may monitor and/or measure signal or data characteristics associated with the communication link and/or traffic communication being exchanged between gateway 230 and user device 210. For example, gateway 230 may monitor and/or measure a latency, a throughput, an error rate, a cost, and/or the like associated with the traffic communication. Accordingly, gateway 230 may determine when the communication is a strong communication link for traffic communication (e.g., the communication link is able to meet characteristic requirements for traffic communication) or relatively weak communication link for traffic communication (e.g., the communication link cannot meet characteristic requirements for traffic communication).

In this way, gateway 230 may monitor a characteristic of the communication link used for traffic communication to enable the gateway 230 to determine whether user device 210 is to send the traffic communication through a second gateway As further shown in FIG. 5, process 500 may include determining that the user device is to send traffic communication through a second network based on the characteristic of the communication link (block 530). For example, if gateway 230 is associated with a terrestrial mobile network, gateway 230 may determine that user device 210 is to send traffic communication through a satellite network. In some implementations, gateway 230 of network 220 may determine that the user device is to send the traffic communication through another network 220 based on a change in the monitored characteristic of the communication link.

According to some implementations, gateway 230 may determine that user device 210 is to send the traffic communication through another network based on the characteristic indicating that the communication link cannot handle the traffic communication. For example, the characteristic may indicate relatively high latency for the traffic communication, relatively low throughput for the traffic communication, relatively high error rate for the traffic communication, and/or the like. In some implementations, gateway 230 may determine that gateway 230 is not associated with a default network (e.g., a terrestrial mobile network) of user device 210. Accordingly, based on characteristics of the communication link and/or user device 210 (e.g., location), gateway 230 may determine that user device 210 is to send traffic through the default network (rather than the network of the gateway 230).

According to some implementations, gateways 230 may implement a mapping process to map subscriptions of user device 210 to one another. For example, user device 210 may be registered to a first network and a second network via first and second subscriptions. Such subscriptions may be tracked and monitored through an application layer of the networks 220, enabling gateways 230 to map the subscriptions to a same user device 210. As such, using the mapping information, gateways 230 may determine which networks 220 (and/or corresponding gateways 230) are to be used for traffic communication by the user device 210.

In this way, gateway 230 may determine that user device 210 is to send traffic communication through another network 220 other than network 220 that corresponds to gateway 230, to enable gateway 230 to send a notification to a second gateway 230 of the other network 220.

As further shown in FIG. 5, process 500 may include sending a notification to a gateway of the second network to indicate that the second network is to handle traffic communication of the user device (block 540). For example, gateway 230, which may be associated with a terrestrial mobile network, may send the notification to another gateway 230 that is associated with a satellite network, to indicate that the satellite network is to handle the traffic communication of user device 210. In some implementations, gateway 230 sends the notification to the other gateway based on determining that the user device 210 is to send the traffic communication through another network 220 based on the characteristic of the communication link.

According to some implementations, gateway 230, which may be associated with a terrestrial mobile network, may identify another gateway 230, which may be associated with a satellite network that is to handle the traffic communication based on mapping information of subscriptions of user device 210. For example, user device 210 may be assigned a subscription identifier (e.g., at an application layer) associated with the terrestrial mobile network and a subscription identifier associated with the satellite network. In such cases, gateways 230 may access the subscription identifiers through mapping information received from user device 210 (e.g., when establishing links between user device 210 and the terrestrial mobile network and satellite network). Accordingly, gateway 230 may identify which gateway 230 of which network 220 is to be prepared to handle traffic communication with user device 210. In some implementations, user device 210 may relay information between gateways 230. For example, if one of the gateways 230 does not have access to an identity of another gateway 230, user device 210 may provide identification information about the corresponding gateways 230 to facilitate communication between the gateways 230.

In this way, gateway 230 may send a notification to another gateway of a network that is to handle traffic communication with user device 210 to enable continuous traffic communication between user device 210 and instances of an application associated with the traffic communication.

As indicated above, FIG. 5 is provided merely as an example. Other examples are possible and may differ from what was described with regard to FIG. 5.

Accordingly, some implementations described herein enable a user device to continuously access and/or interface with an instance of an application or system associated with the user device. According to some implementations described herein, a user device may establish communication links with multiple networks (e.g., one or more terrestrial networks and/or one or more satellite networks) to ensure that user device has full coverage and an ability to send and/or receive information when the user device may traverse between coverage areas, geographical locations, and/or borders of governmental entities. Accordingly, some implementations described herein prevent packet loss and/or inoperability of features of a user device by enabling relatively ubiquitous coverage for the user device. As such, communication resources, networking resources, and/or the like which may be associated with packet loss, can be preserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
   a terrestrial mobile network radio;
   a satellite network radio; and
   one or more processors to:
      establish, via the terrestrial mobile network radio, a first communication link with a terrestrial mobile network;
      establish, via the satellite network radio, a second communication link with a satellite network,
         where the terrestrial mobile network is operated by a first service provider entity and the satellite network is operated by a second service provider entity,
            the second service provider entity being different from the first service provider entity;
      monitor a characteristic of the first communication link and a characteristic of the second communication link;
      select the terrestrial mobile network or the satellite network for traffic communication for a primary communication link and the other of the terrestrial mobile network or the satellite network as an alternative communication link based on the characteristic of the first communication link and the characteristic of the second communication link; and
      perform an action associated with the traffic communication based on selecting the terrestrial mobile network or the satellite network for the traffic communication,
         wherein the one or more processors, when performing the action, are to:
            transmit the traffic communication through the primary communication link, while concurrently maintaining the alternative communication link, by utilizing a first instance of an application that is running on one of the terrestrial mobile network or the satellite network that is selected for the primary communication link, and
            switch from transmitting the traffic communication through the primary communication link to transmitting the traffic communication through the alternative communication link without interrupting operation of the first instance of the application by utilizing a second instance of the application that is running on the other one of the terrestrial mobile network or the satellite network that is selected as the alternative communication link.

2. The user device of claim 1, wherein the characteristic of the first communication link and the characteristic of the second communication link comprise at least one of:
   a latency of the first communication link and a latency of the second communication link,
   a throughput of the first communication link and a throughput of the second communication link,
   an error rate of the first communication link and an error rate of the second communication link,
   a cost associated with the first communication link and a cost associated with the second communication link,
   a strength of signal on the first communication link and the second communication link, or
   a quality of service associated with communicating via the first communication link and communicating via the second communication link.

3. The user device of claim 1, wherein the characteristic of the first communication link is one of a plurality of characteristics of the first communication link and the characteristic of the second communication link is one of a plurality of characteristics of second first communication link,
   where the one or more processors, when selecting the terrestrial mobile network or the satellite network, are to:
      generate a first score using a weighted combination of values associated with the plurality of characteristics of the first communication link;
      generate a second score using a weighted combination of values associated with the plurality of characteristics of the second communication link; and
      select the terrestrial mobile network or the satellite network based on the first score and the second score.

4. The user device of claim 3, where weights corresponding to the plurality of characteristics of the first communication link and weights corresponding to the plurality of characteristics of the second communication link are determined based on a setting of the user device.

5. The user device of claim 1, where the user device comprises a navigational computer of an autonomous vehicle.

6. A method, comprising:
   causing, by a device, a first communication link to be established between a user device and a first terrestrial mobile network regulated by a first governmental entity;
   causing, by the device, a second communication link to be established between the user device and a second terrestrial mobile network regulated by a second governmental entity,
      wherein the second governmental entity is different from the first governmental entity;
   monitoring, by the device, a characteristic of the first communication link and a characteristic of the second communication link;
   selecting, by the device, the first terrestrial mobile network or the second terrestrial mobile network for a primary communication link and the other of the first terrestrial mobile network or the second terrestrial mobile network as an alternative communication link for traffic communication based on the characteristic of the first communication link and the characteristic of the second communication link; and performing, by the device, an action associated with the traffic communication based on selecting the first terrestrial mobile network or the second terrestrial mobile network for the traffic communication, where performing the action comprises:

transmitting the traffic communication through the primary communication link, while concurrently maintaining the alternative communication link by utilizing a first instance of an application that is running on one of the terrestrial mobile network or the satellite network that is selected for the primary communication link, and switching from transmitting the traffic communication through the primary communication link to transmitting the traffic communication through the alternative communication link without interrupting operation of the first instance of the application by utilizing a second instance of the application that is running on the other one of the terrestrial mobile network or the satellite network that is selected as the alternative communication link.

7. The method of claim 6, where selecting the first terrestrial mobile network or the second terrestrial mobile network further comprises:

selecting the first terrestrial mobile network or the second terrestrial mobile network based on a location of the user device.

8. The method of claim 6, further comprising:

establishing a third communication link with a satellite network;

monitoring a characteristic of the third communication link;

selecting one of the first terrestrial mobile network, the second terrestrial mobile network, or the satellite network for the primary communication link and the other of the first terrestrial mobile network, the second terrestrial mobile network, or the satellite network as the alternative communication link for the traffic communication based on the characteristic of the first communication link, the characteristic of the second communication link, and the characteristic of the third communication link; and performing the action associated with the traffic communication based on selecting the one of the first terrestrial mobile network, the second terrestrial mobile network, or the satellite network.

9. The method of claim 6, where the traffic communication corresponds to an instance of an application being executed by the user device, an instance of an application being executed on the first terrestrial mobile network, and an instance of the application being executed on the second terrestrial mobile network.

10. The method of claim 6, where the user device comprises a navigational computer of an autonomous or a semi-autonomous vehicle.

11. A non-transitory computer-readable medium storing instructions, the instructions comprising:

one or more instructions that, when executed by one or more processors, cause the one or more processors to:

establish a first communication link between a user device and a first terrestrial mobile network operated by a first service provider entity;

establish a second communication link between the user device and a second terrestrial mobile network operated by a second service provider entity, wherein the second service provider entity is different from the first service provider entity;

monitor a characteristic of the first communication link and a characteristic of the second communication link;

select the first terrestrial mobile network or the second terrestrial mobile network for a primary communication link and the other of the first terrestrial mobile network or the second terrestrial mobile network as an alternative communication link for traffic communication based on the characteristic of the first communication link and the characteristic of the second communication link; and perform an action associated with the traffic communication based on selecting the first terrestrial mobile network or the second terrestrial mobile network for the traffic communication, where the one or more instructions, that cause the one or more processors to perform the action, cause the one or more processors to:

transmit the traffic communication through the primary communication link, while concurrently maintaining the alternative communication link, by utilizing a first instance of an application that is running on one of the terrestrial mobile network or the satellite network that is selected for the primary communication link, and switch from transmitting the traffic communication through the primary communication link to transmitting the traffic communication through the alternative communication link without interrupting operation of the first instance of the application by utilizing a second instance of the application that is running on the other one of the terrestrial mobile network or the satellite network that is selected as the alternative communication link.

12. The non-transitory computer-readable medium of claim 11, wherein the first terrestrial mobile network is regulated by a first governmental entity and the second terrestrial mobile network is regulated by a second governmental entity, wherein the second governmental entity is different from the first governmental entity.

13. The non-transitory computer-readable medium of claim 11, where the one or more instructions, when executed by the one or more processors, further cause the one or more processors to:

establish a third communication link with a satellite network;

monitor a characteristic of the third communication link;

select one of the first terrestrial mobile network, the second terrestrial mobile network, or the satellite network for the primary communication link and the other of the first terrestrial mobile network, the second terrestrial mobile network, or the satellite network as an alternative communication link for the traffic communication based on the characteristic of the first communication link, the characteristic of the second communication link, and the characteristic of the third communication link; and perform the action associated with the traffic communication based on selecting the one of the first terrestrial mobile network, the second terrestrial mobile network, or the satellite network.

14. The non-transitory computer-readable medium of claim 11, wherein the characteristic of the first communication link and the characteristic of the second communication link comprise at least one of:
  a latency of the first communication link and a latency of the second communication link,
  a throughput of the first communication link and a throughput of the second communication link;
  an error rate of the first communication link and an error rate of the second communication link; or
  a cost associated with the first communication link and a cost associated with the second communication link.

15. The non-transitory computer-readable medium of claim 11, wherein the user device comprises a computer device associated with a vehicle.

16. The user device of claim 1, where the first service provider entity is located across a government border from the second service provider entity.

17. The user device of claim 1, where the one or more processors, when performing the action, are to:
  send a notification to the terrestrial mobile network or the satellite network based on selecting the terrestrial mobile network or the satellite network for the traffic communication,
  wherein the notification indicates that the traffic communication is to be exchanged through the terrestrial mobile network or the satellite network based on selecting the terrestrial mobile network or the satellite network for the traffic communication.

18. The method of claim 6, where the first governmental entity is located across a government border from the second governmental entity.

19. The method of claim 6, where performing the action comprises:
  sending a notification to the first terrestrial mobile network or the second terrestrial mobile network based on selecting the first terrestrial mobile network or the second terrestrial mobile network for the traffic communication,
  wherein the notification indicates that the traffic communication is to be exchanged through the first terrestrial mobile network or the second terrestrial mobile network based on selecting the first terrestrial mobile network or the second terrestrial mobile network for the traffic communication.

20. The non-transitory computer-readable medium of claim 11, where the first service provider entity is located across a government border from the second service provider entity.

* * * * *